Aug. 4, 1964  G. FALK  3,143,363
METHOD FOR FOLDING LARGE AREA MAPS INTO THE SHAPE OF A BOOK
AND CORRESPONDINGLY FOLDED MAPS
Filed July 11, 1961
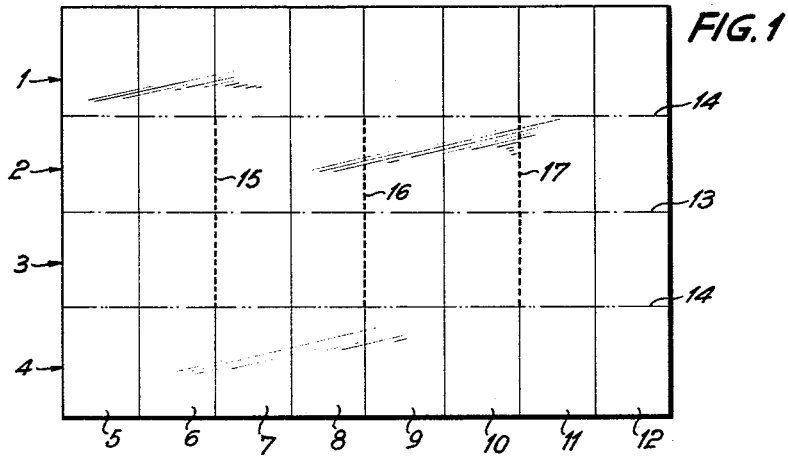
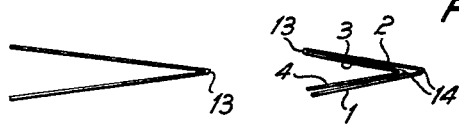
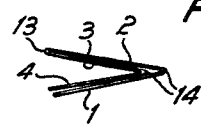
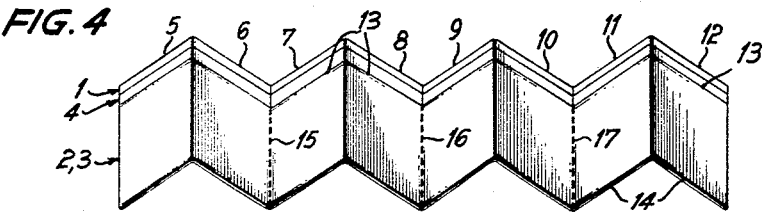
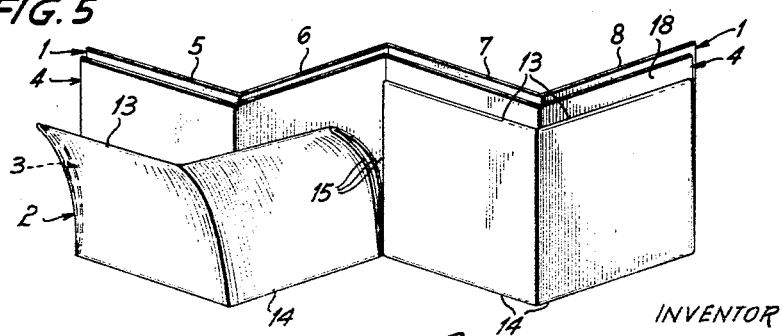
INVENTOR
Gerhard Falk
By Beaman & Beaman
attys

United States Patent Office 3,143,363
Patented Aug. 4, 1964

3,143,363
METHOD FOR FOLDING LARGE AREA MAPS INTO THE SHAPE OF A BOOK AND CORRESPONDINGLY FOLDED MAPS
Gerhard Falk, Burchardstrasse 8, Hamburg, Germany
Filed July 11, 1961, Ser. No. 123,224
Claims priority, application Germany July 13, 1960
1 Claim. (Cl. 283—35)

The invention relates to a method of folding large area maps or sheets into the shape of a book and to maps folded in accordance with this method.

Many attempts have been made to fold maps in longitudinal and in transverse directions in zigzag fashion so as to form quadrants which, when folded together, will form a book. In order to enable the user to view certain quadrants of the map without folding the whole map, slits have been provided coinciding with certain fold lines, thereby allowing a partial opening of the map. These methods of folding a map are afflicted with the disadvantage that the folding process due to the slits cannot be accomplished mechanically. Therefore, manual folding is necessary which raises the manufacturing costs considerably.

Therefore, the main object of this invention is to provide a method allowing mechanical folding of large area maps into quadrants to form a book in which certain desired sections of the map extending over the entire height of the map from north to south may be opened and viewed without effecting the remaining folded sections, but in which it is also possible to unfold the entire map without its losing its consistency as a sheet.

Another object of the invention is to provide a method allowing mechanical folding of a map sheet printed on one side in the above-mentioned manner so as to form north and southwardly extending rows of four quadrants.

For solving this problem the invention provides a method of folding a large map printed on one side of a sheet into book form, including the steps of doubling the sheet in the east-west direction of the map with the blank side in contacting engagement, redoubling the doubled sheet in east-west direction of the map, thereby forming four east-westwardly extending fields, zigzag folding said redoubled sheet for forming quadrants, said folding operations being carried through mechanically after said sheet has been perforated along predetermined north-south fold lines of said two rows of inner quadrants, thereby maintaining the consistency of the entire unfolded map and yet allowing separate quadrants to be unfolded if desired.

Another object of the invention is to provide a method allowing mechanical folding of a map printed upon both sides of a sheet in the aforementioned manner so as to form contiguous north-southwardly extending rows of four quadrants.

According to the invention this problem is solved by providing a method of folding a large map printed upon both sides of a sheet into book form, including the steps of doubling the sheet in east-west direction of the map and zigzag folding said doubled sheet for forming quadrants, said folding operations being carried through mechanically after said sheet has been perforated along predetermined north-south folded lines of said lower row of quadrants only, thereby maintaining the consistency of the entire unfolded map and yet allowing separate quadrants to be unfolded if desired.

Further objects, features and advantages of the invention will be seen from the description of embodiments of the invention given by way of example in connection with the drawings.

In the drawings,

FIG. 1 shows a sheet of paper printed on one side with the folding lines indicated thereon, FIG. 2 shows the sheet of paper after the middle folding has been carried out, looking edgewise, FIG. 3 shows the sheet of paper edgewise after the second edge folding has been carried out, FIG. 4 shows a map folded in the east-west direction according to FIG. 3 and in the north-south direction in zigzag fashion, partially open in the east-west direction, and FIG. 5 is a partial view with the inner sides unfolded.

The sheet according to the embodiment given by way of example in printed on one side and, during the last printing operation, the perforations numbered 15, 16 and 17 are made by means of perforating knives arranged on a counter-pressure roller. The sheet is then folded along the folding lines 13 and 14 by means of two blades arranged in parallel relation, so that the sheet zones 1, 2, 3 and 4 are formed, the folding being carried out according to FIG. 3, i.e. there are present two folds 14, and the two inner zones 2 and 3 are disposed within the two outer zones 1 and 4.

When a folding is carried out on the lines 14, the air forming a cushion between the zones may escape laterally through the perforations 15, 16, and 17.

After carrying out the doubling type of foldings, i.e. after having made the foldings in the longitudinal direction on the lines 13 and 14, the zigzag type of folding is carried out in the known manner by means of rollers and pockets, whereby the transverse zones 5–12 of the sheet are formed. The trapped air may escape through the perforations 15, 16 and 17. When carrying out the folding it is considered to be of advantage to keep the two longitudinal zones 2 and 3 a little smaller in their height than the zones 1 and 4, so that the turning of the insidely disposed flaps and zone fields 2 and 3 corresponding to the transverse zones 5–12 is facilitated. Thereby, it is also possible to print indicia or instructions pertaining to the map on the projecting edge of the fields of the longitudinal zone 4.

If, in accordance with the invention, a sheet printed on both sides is used, half of the height of the sheet shown in the embodiment given by way of example is used, and therefore only one folding according to one of the folding lines 14 will be necessary, so that, for instance, the map will consist of the two longitudinal zones 1 and 2 and the transverse zones 5–12. The perforations will then also be present only in the manner shown over the height of the zone 2.

In FIG. 5 it is shown how an inner flap consisting of the longitudinal zones 2 and 3 with the transverse zones 5 and 6 may be folded downwardly after the perforations 15 have been torn, so that the portion of the map printed on the transverse fields 5 and 6 of the longitudinal zones 4 and 3 may be viewed. If, however, the map folded in the manner of a book is turned by 180°, the prints present on the map fields of the longitudinal zones 1 and 2 and the transverse zones 5 and 6 may be viewed. The viewing of the remaining fields of the map is achieved in a corresponding manner.

It will of course be understood that various changes in details of construction and arrangement of parts may be made by those skilled in the art without departing from the scope of the invention as set forth in the appended claim.

I claim:

A method of folding a sheet into book form capable of being performed mechanically wherein said sheet has a primary side and a secondary side, comprising the steps of linearly perforating said sheet at spaced parallel locations forming perforation lines extending in a first direction, substantially doubling said sheet with the secondary side in engagement forming a first fold perpendicular to and centrally intersecting said perforated lines, refolding the substantially doubled sheet to form a second fold parallel to said first fold and slightly offset with respect to the center line of the substantially doubled sheet parallel to said first fold whereby a margin will be formed along an edge of the completely folded sheet, said perforated lines terminating at said second fold, zigzag folding said refolded sheet into portions along parallel folds perpendicularly disposed to said first and second folds, said parallel folds being spaced apart a distance equal to one-half the distance separating adjacent perforated lines, and alternate parallel folds coinciding with said perforated lines.

References Cited in the file of this patent

UNITED STATES PATENTS

| | | |
|---|---|---|
| 1,531,065 | Boyer | Mar. 24, 1925 |
| 2,572,460 | Falk | Oct. 23, 1951 |

FOREIGN PATENTS

| | | |
|---|---|---|
| 212,445 | Great Britain | Mar. 13, 1924 |
| 425,788 | Great Britain | Mar. 21, 1935 |
| 680,558 | Germany | Aug. 31, 1939 |
| 781,461 | France | Feb. 25, 1935 |
| 1,019,491 | France | Oct. 29, 1952 |
| 1,116,192 | France | Jan. 30, 1956 |